United States Patent
Sugimoto et al.

(10) Patent No.: US 12,545,801 B2
(45) Date of Patent: Feb. 10, 2026

(54) INKJET TREATMENT SOLUTION, AND INKJET PRINTING DEVICE

(71) Applicant: KYOCERA CORPORATION, Kyoto (JP)

(72) Inventors: Hiroko Sugimoto, Muko (JP); Jumpei Hobo, Yamatokoriyama (JP); Go Toriyama, Osaka (JP); Jun Hioki, Muko (JP)

(73) Assignee: KYOCERA CORPORATION, Kyoto (JP)

( * ) Notice: Subject to any disclaimer, the term of this patent is extended or adjusted under 35 U.S.C. 154(b) by 53 days.

(21) Appl. No.: 18/565,519

(22) PCT Filed: Sep. 9, 2022

(86) PCT No.: PCT/JP2022/033864
§ 371 (c)(1),
(2) Date: Nov. 30, 2023

(87) PCT Pub. No.: WO2023/042761
PCT Pub. Date: Mar. 23, 2023

(65) Prior Publication Data
US 2024/0263032 A1    Aug. 8, 2024

(30) Foreign Application Priority Data

Sep. 17, 2021 (JP) ................... 2021-151682
Feb. 28, 2022 (JP) ................... 2022-028912

(51) Int. Cl.
*C09D 11/54* (2014.01)
*B41J 3/407* (2006.01)
(Continued)

(52) U.S. Cl.
CPC ............. *C09D 11/54* (2013.01); *B41J 3/4078* (2013.01); *B41J 11/06* (2013.01); *B41J 11/14* (2013.01);
(Continued)

(58) Field of Classification Search
CPC ....... C09D 11/322; C09D 11/38; C09D 11/54; C09D 11/40; C09D 11/30; C09D 11/033;
(Continued)

(56) References Cited

U.S. PATENT DOCUMENTS 5,510,415 A * 4/1996 Zahrobsky ............ D06P 1/5292
347/100
2010/0214352 A1* 8/2010 Tsunoda .................... D06P 5/30
524/386

(Continued)

FOREIGN PATENT DOCUMENTS

EP       4241994 A1    9/2023
JP     2014015008 A    1/2014
(Continued)

*Primary Examiner* — John P Zimmermann
(74) *Attorney, Agent, or Firm* — HAUPTMAN HAM, LLP

(57) ABSTRACT

One aspect of the present invention relates to an inkjet treatment liquid containing a water-soluble cationic polymer and an organic acid salt, wherein a content of the water-soluble cationic polymer is 0.1 wt % or more and less than 10 wt % with respect to the entire amount of the inkjet treatment liquid.

12 Claims, 1 Drawing Sheet

(51) Int. Cl.
   *B41J 11/06*   (2006.01)
   *B41J 11/14*   (2006.01)
   *C09D 11/38*   (2014.01)
   *D06P 5/00*   (2006.01)
   *D06P 5/30*   (2006.01)

(52) U.S. Cl.
   CPC .............. *C09D 11/38* (2013.01); *D06P 5/002* (2013.01); *D06P 5/30* (2013.01)

(58) Field of Classification Search
   CPC ..................... B41M 5/0017; B41M 5/0011; B41M 5/0023; B41M 5/0064; B41M 5/0047; D06P 5/30; B41J 11/002
   See application file for complete search history.

(56) References Cited

U.S. PATENT DOCUMENTS

| | | | | |
|---|---|---|---|---|
| 2011/0211012 | A1* | 9/2011 | Irita | B41J 11/00214 347/20 |
| 2012/0306976 | A1* | 12/2012 | Kitagawa | D06P 5/30 347/100 |
| 2012/0320137 | A1* | 12/2012 | Fujii | B41J 2/2107 347/100 |
| 2013/0143008 | A1 | 6/2013 | Gotou et al. | |
| 2015/0022582 | A1 | 1/2015 | Katsuragi | |
| 2015/0283828 | A1 | 10/2015 | Aoai et al. | |
| 2017/0355868 | A1* | 12/2017 | Saiga | C09D 11/40 |
| 2018/0058002 | A1* | 3/2018 | Ohashi | B41J 3/4078 |
| 2019/0264056 | A1* | 8/2019 | Okuda | B41J 2/2114 |
| 2020/0207140 | A1 | 7/2020 | Seguchi | |
| 2021/0071026 | A1* | 3/2021 | Toeda | C09D 11/322 |
| 2021/0170779 | A1* | 6/2021 | Asakawa | C09D 11/033 |
| 2021/0187971 | A1 | 6/2021 | Sato | |
| 2023/0095396 | A1 | 3/2023 | Bar et al. | |
| 2024/0034898 | A1 | 2/2024 | Sugimoto | |

FOREIGN PATENT DOCUMENTS

| | | |
|---|---|---|
| JP | 2020104486 A | 7/2020 |
| JP | 2021020394 A | 2/2021 |
| WO | 2012023629 A1 | 2/2012 |
| WO | 2021201873 A1 | 10/2021 |

* cited by examiner

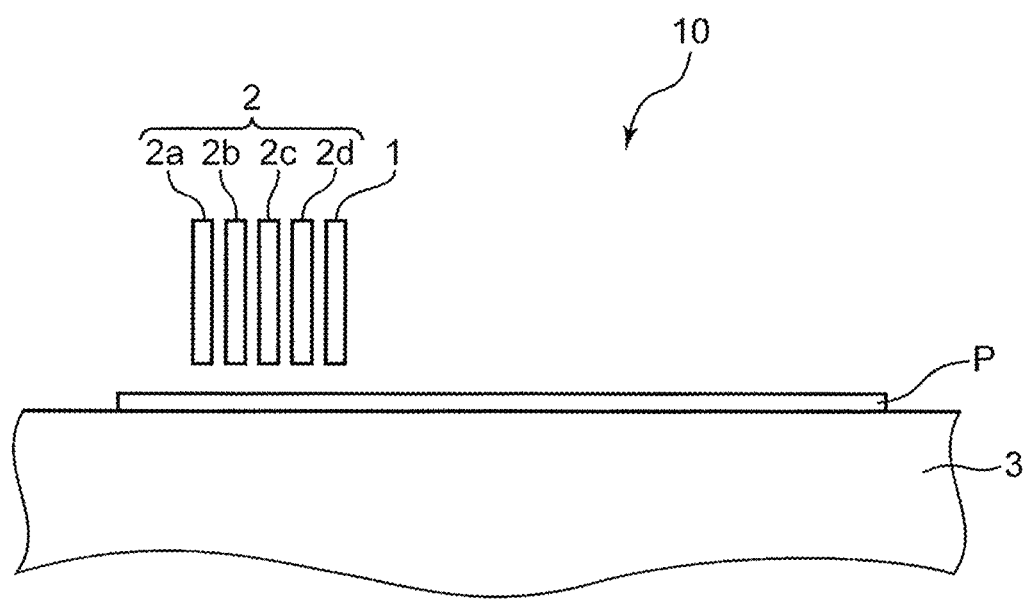

INKJET TREATMENT SOLUTION, AND INKJET PRINTING DEVICE

RELATED APPLICATIONS

The present application is a National Phase of International Application Number PCT/JP2022/033864 filed Sep. 9, 2022, which claims the benefit of priority from Japanese Patent Application No. 2021-151682, filed on Sep. 17, 2021 and Japanese Patent Application No. 2022-028912, filed on Feb. 28, 2022.

TECHNICAL FIELD

The present disclosure relates to an inkjet treatment liquid. The present disclosure further relates to an inkjet textile printing apparatus using the inkjet treatment liquid.

BACKGROUND ART

In the inkjet recording method, it is known to apply a pretreatment liquid prior to ink application. For example, a method involving using a treatment liquid containing a flocculant as a component forming an aggregate together with a color material in an ink has been reported.

Patent Literature 1 discloses an image forming method including: a pretreatment liquid application step of applying a pretreatment liquid on a recording medium including a substrate and a coating layer disposed at least on one surface of the substrate, the pretreatment liquid being applied on a surface of the recording medium with the coating layer; and an image formation step of forming an image on the recording medium after applying the pretreatment liquid by discharging an aqueous ink by inkjet method, wherein the pretreatment liquid contains at least a water-soluble cationic polymer, an organic acid ammonium salt, and water, and a content of the water-soluble cationic polymer in the pretreatment liquid is 10% by mass to 70% by mass, and a content of the organic acid ammonium salt is 1 to 40% by mass.

Patent Literature 2 discloses an inkjet recording method including: a treatment liquid attachment step including attaching a treatment liquid containing a flocculant to a recording medium; and an ink attachment step including attaching an aqueous ink composition to the recording medium, wherein the treatment liquid contains one or two or more of metal salts, cationic polymers, and organic acids as the flocculant.

CITATION LIST

Patent Literature

Patent Literature 1: JP-A-2014-15008
Patent Literature 2: JP-A-2020-104486

SUMMARY OF INVENTION

An inkjet treatment liquid according to one aspect of the present disclosure contains a water-soluble cationic polymer and an organic acid salt, wherein a content of the water-soluble cationic polymer is 0.1 wt % or more and less than 10 wt % with respect to the entire amount of the inkjet treatment liquid.

BRIEF DESCRIPTION OF DRAWINGS

FIG. 1 is a schematic diagram illustrating one embodiment of an inkjet textile printing apparatus in which an inkjet treatment liquid of the present embodiment is used.

DESCRIPTION OF EMBODIMENTS

The invention described in Patent Literature 1 as described above is an image forming method in which a pretreatment liquid for aggregating an ink pigment is applied to a recording medium, then dried, and then an aqueous ink is discharged by an inkjet method to form an image, and the concentration of a cationic polymer in the treatment liquid is very high (10% by mass or more). Since the treatment liquid containing such a high concentration of the cationic polymer cannot be discharged from a processing head, a step of applying the treatment liquid before discharging the ink is required and complicated.

When the treatment liquid described in Patent Literature 2 is used, sufficient aggregation property of the ink may not be obtained.

The techniques described in Patent Literatures 1 and 2 described above are inkjet image forming methods for performing printing mainly on a paper medium such as plain paper or a liquid low-absorbent recording medium such as a film sheet. Therefore, those techniques aim at forming a good image with inhibited bleeding or the like, and their use for textile printing on a cloth or the like is not much considered. In inkjet recording to be used for textile printing, it is required to improve fastness to rubbing and fastness to laundering, and to suppress roughness of a fabric as a textile printing target and to improve texture such as touch.

Hereinafter, embodiments of the present disclosure will be specifically described, but the present disclosure is not limited thereto.

[Inkjet Treatment Liquid]

The inkjet treatment liquid (hereinafter, sometimes simply referred to as "treatment liquid") according to one embodiment of the present disclosure contains a water-soluble cationic polymer and an organic acid salt, wherein a content of the water-soluble cationic polymer is 0.1 wt % or more and less than 10 wt % with respect to the entire amount of the inkjet treatment liquid. The treatment liquid may be called as a processing solution.

The treatment liquid of the present embodiment is a pretreatment liquid to be attached to a recording target prior to an ink. The water-soluble cationic polymer and the organic acid salt contained in the treatment liquid reactively aggregate with the pigment contained in the ink to be attached thereafter, so that superior color developability can be secured.

Owing to the condition that the content of the water-soluble cationic polymer is 0.1 wt % or more and less than 10 wt % with respect to the entire amount of the inkjet treatment liquid, the treatment liquid of the present embodiment can be ejected from an inkjet head member, so that a step of application by a roll coating method, a blade coating method, or the like can be omitted. That is, since the treatment liquid of the present embodiment can be ejected by the inkjet member similarly to an ink, the treatment liquid can be easily attached to a recording target.

When the treatment liquid of the present embodiment is used for textile printing, in addition to the above merits, there is an advantage that the wet friction resistance and the fastness to laundering can be improved, and the texture of a fabric is also improved. In particular, owing to the inclusion of the water-soluble cationic polymer in the above range, the resulting textile printed product is strong against wet friction. If the content of the water-soluble cationic polymer is 10 wt % or more, sufficient fastness to wet rubbing cannot be obtained.

That is, in inkjet recording, the inkjet treatment liquid of the present disclosure can be ejected from an inkjet head member, and superior color developability can be obtained. Furthermore, when the inkjet treatment liquid of the present disclosure is used for textile printing, there is a superior advantage that the wet friction resistance and the fastness to laundering can be improved, and the texture of a fabric is also improved.

The water-soluble cationic polymer contained in the inkjet treatment liquid of the present embodiment is not particularly limited as long as it is a water-soluble and positively charged cationic polymer, and examples thereof include cationic polymers such as ammonium-containing polymers, amine-containing polymers, polyallylamine, polyvinylamine, polyimine, polyvinylpyrrolidone, polyethyleneimine, polyvinylpyridine, aminoacetalized polyvinyl alcohol, ionene polymers, polyvinylimidazole, polyvinylbenzylphosphonium, polyalkylallylammonium, polyamidine, and polyaminesulfone. Among them, a quaternary ammonium-containing polymer, a diallyldimethylammonium-sulfur dioxide copolymer, a diallyldimethylammonium chloride-acrylamide copolymer, a diallyldimethylammonium chloride polymer, and a dimethylamine-ammonia-epichlorohydrin polycondensate are particularly preferably recited from the viewpoint that further superior color developability can be obtained. These may be used singly or two or more of them may be used in combination.

The weight-average molecular weight of the cationic polymer to be used in the present embodiment is not particularly limited, but is preferably about 1000 to 10000. When the molecular weight is in this range, it is considered that the ejectability from an inkjet head is better.

As described above, the content of the cationic polymer is 0.1 wt % or more and less than 10 wt % with respect to the entire amount of the inkjet treatment liquid. The lower limit value of the content of the cationic polymer is more preferably 0.5 wt % or more, and further preferably 1 wt % or more. The upper limit is more preferably 9 wt % or less, and further preferably 8 wt % or less.

The treatment liquid of the present embodiment further contains an organic acid salt. Examples of the organic acid salt include an organic acid magnesium salt, an organic acid ammonium salt, an organic acid calcium salt, an organic acid aluminum salt, an organic acid sodium salt, and an organic acid potassium salt. These organic acid salts may have hydration water in their raw material form. Examples of the organic acid magnesium salt to be used in the present embodiment include magnesium acetate, magnesium lactate, magnesium sulfate, and trimagnesium phosphate. The organic acid ammonium salt to be used in the present embodiment is not particularly limited, but ammonium acetate, ammonium propionate, ammonium oxalate, ammonium tartrate, ammonium lactate, ammonium succinate (diammonium succinate), diammonium malonate, ammonium malate, ammonium citrate, diammonium hydrogen citrate, triammonium citrate, ammonium L-glutamate, and the like are suitably used from the viewpoint of solubility in water.

Furthermore, although the organic acid ammonium salt is superior in effects such as color developability, there is a possibility that odor is generated, and therefore it is more preferable to use an organic acid magnesium salt.

The content of the organic acid salt is preferably about 0.1 to 15 wt % b with respect to the entire amount of the inkjet treatment liquid. It is considered that owing to the condition that the content of the organic acid salt is in the above range, the aggregation effect of the ink component is enhanced, and the color developability (image density) is further enhanced. The lower limit value of the content of the organic acid salt is more preferably 0.5 wt % or more, and further preferably 1 wt % or more. The upper limit is more preferably 14 wt % or less, and further preferably 13 wt % or less.

In the treatment liquid of the present embodiment, it is more preferable that the content of the organic acid salt is larger than the content of the water-soluble cationic polymer. It is considered that, owing to such a configuration, the texture (touch) of a fabric as a textile printing target is improved when the processing liquid is used for textile printing. At that time, the content of the organic acid salt is preferably 1 to 15 wt % with respect to the entire amount of the inkjet treatment liquid, and it is considered that, owing to such a configuration, the above effect can be further obtained.

When the organic acid salt is an organic acid magnesium salt, it is preferable that the content of the organic acid magnesium salt is about 5 to 11 wt % with respect to the entire amount of the inkjet treatment liquid because the cost of a pretreatment liquid can be further reduced while maintaining fastness to laundering. On the other hand, it is also preferable that the content of the organic acid magnesium salt is 12 to 15 wt % with respect to the entire amount of the inkjet treatment liquid. It is considered that, owing to such a configuration, the fastness to laundering when used for textile printing is further improved.

The treatment liquid of the present embodiment preferably contains a metal salt in addition to the components described above. It is considered that as a result of containing the metal salt, the aggregation effect as described above can be further acquired, and the fastness to laundering when used for textile printing is also improved.

The metal salt that can be used in the present embodiment is preferably a polyvalent metal salt composed of a di- or more valent metal ion and an anion, and examples of the di- or more valent metal ion include ions of calcium, magnesium, copper, nickel, zinc, barium, aluminum, titanium, strontium, chromium, cobalt, iron, and the like.

Examples of a specific metal salt include calcium acetate, aluminum acetate, calcium carbonate, calcium nitrate, calcium chloride, calcium sulfate, calcium hydroxide, barium sulfate, barium chloride, zinc carbonate, zinc sulfide, aluminum silicate, calcium silicate, and copper nitrate. These metal salts may be used singly or two or more of them may be used in combination. Among them, calcium acetate and the like are more preferably used because of their superior in solubility in water. These metal salts may have hydration water in their raw material form.

When the treatment liquid of the present embodiment contains a metal salt, the content thereof is preferably about 0.1 to 5 wt % with respect to the entire amount of the inkjet treatment liquid. The lower limit value of the content of the metal salt is more preferably 0.5 wt % or more, and further preferably 1 wt % or more. The upper limit is more preferably 4 wt % or less, and further preferably 3 wt % or less.

In the treatment liquid of the present embodiment, it is preferable that the content of the organic acid salt is larger than the content of the metal salt. It is considered that, owing to such a configuration, the texture can be further improved while the above-described fastness to laundering is improved. At that time, in view of an advantage that the effects described above are further obtained, it is preferable that the content of the metal salt is 0.1 to 5 wt % with respect to the entire amount of the inkjet treatment liquid, and the content of the organic acid salt is 1 to 15 wt % with respect to the entire amount of the inkjet treatment liquid.

In the treatment liquid of the present embodiment, the remainder other than the above-described components is usually water or an aqueous solvent composed of water and an organic solvent.

Examples of the organic solvent that can be contained in the treatment liquid of the present embodiment include glycols, alcohols, aliphatic hydrocarbons, aromatic hydrocarbons, ketones, esters, ethers, and vegetable oils. Examples of the water-soluble organic solvent include a polyhydric alcohol, an ether compound of a polyhydric alcohol, a nitrogen-containing compound, an alcohol compound, a sulfur-containing compound, propylene carbonate, and ethylene carbonate.

Examples of the polyhydric alcohol include primary diol compounds having 5 to 8 carbon atoms, secondary diol compounds having 2 to 4 carbon atoms, 1,2,6-hexanetriol, glycerin, trimethylolpropane, sugar alcohols (e.g., xylitol), and saccharides (e.g. xylose, glucose, and galactose).

Examples of the primary diol compound include 2-methylpentane-2,4-diol, triethylene glycol, tetraethylene glycol, 1,5-pentanediol, and 1,2-hexanediol.

Examples of the secondary diol compound include ethylene glycol, 1,2-propanediol, 1,3-propanediol, butylene glycol, and diethylene glycol.

Examples of the ether compound of a polyhydric alcohol include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and ethylene oxide adducts of diglycerin.

Examples of the nitrogen-containing compound include pyrrolidone, N-methyl-2-pyrrolidone, cyclohexylpyrrolidone, and triethanolamine.

Examples of the alcohol compound include ethanol, isopropyl alcohol, butyl alcohol, and benzyl alcohol.

Examples of the sulfur-containing compound include thiodiethanol, thiodiglycerol, sulfolane, and dimethyl sulfoxide.

Among the organic solvents described above, glycols such as propylene glycol are preferably used.

The organic solvent as described above may be used singly or two or more thereof may be used in combination.

When the treatment liquid of the present embodiment contains an organic solvent, the content thereof is preferably 3 wt % or more and 50 wt % or less with respect to the entire amount of the inkjet treatment liquid. Owing to the inclusion of the organic solvent in the above-described range, there are advantages that a treatment liquid having a viscosity at which the treatment liquid can be stably ejected can be provided, and drying of the treatment liquid can be prevented.

Furthermore, the treatment liquid of the present embodiment may contain a surfactant for the purpose of adjusting the surface tension to appropriate one. The surfactant that can be used is not particularly limited, and examples thereof include nonionic surfactants, cationic surfactants, and anionic surfactants.

When the treatment liquid of the present embodiment contains a surfactant, the content thereof is preferably 0.1 wt % or more and 5 wt % or less with respect to the entire amount of the inkjet treatment liquid. Owing to the inclusion of the surfactant in the above-described range, there is an advantage that a treatment liquid having a viscosity at which the treatment liquid can be stably ejected can be provided.

The treatment liquid of the present embodiment may contain other additives as long as the effects of the present disclosure are not impaired thereby. Examples of the additive include a dissolution stabilizer, an anti-drying agent, an antioxidant, a viscosity regulator, a pH regulator, and a fungicide.

The treatment liquid of the present embodiment can be suitably used particularly for inkjet textile printing. When a pigment ink that enables printing on many types of fabric is used, it is necessary to fix the pigment to a fabric surface. If the pigment cannot be fixed to the fabric surface, there is a problem of poor fastness to rubbing. On the other hand, when the pigment and the binder resin do not stay on the surface of the fabric and penetrate deep, not only the color developability is poor, but also the ink and the binder resin enter among fibers, so that there is a problem that the touch becomes hard, that is, the texture deteriorates. Furthermore, in the case of a textile printed matter, it is also required that a printed image be difficult to be detached even when detergent is mixed (fastness to laundering).

The problems described above can be improved by using the treatment liquid of the present embodiment. That is, when the treatment liquid of the present embodiment is used, superior color developability of an ink can be exhibited in the preparation of a textile printed matter. In addition, the processing liquid of the present embodiment is very useful for industrial use because it has superior advantages of improving wet friction resistance and fastness to laundering and also improving the texture of a fabric.

In the present embodiment, the treatment liquid described above does not require troubles including padding dry to a fabric in advance, and also has an advantage that putting the treatment liquid on a fabric by an inkjet system can greatly reduce the trouble of conditioning the fabric.

[Inkjet Textile Printing Apparatus]

Next, an inkjet textile printing apparatus according to the present embodiment will be described.

An inkjet textile printing apparatus 10 according to the present embodiment includes at least a processing head 1 configured to eject a treatment liquid to at least an image formation area of a textile printing target: a recording head 2 configured to eject an ink to the image formation area of the textile printing target; and a mounting table 3 configured to convey the textile printing target, wherein the treatment liquid to be ejected from the processing head is the inkjet treatment liquid described above. Note that, for ease of understanding, FIG. 1 schematically illustrates each constituent element mainly, and the size, the number, and the like of each illustrated constituent element may be appropriately changed. FIG. 1 is a side view illustrating a main part of the inkjet textile printing apparatus 10, which is one example of the inkjet textile printing apparatus according to the present embodiment. The inkjet textile printing apparatus 10 illustrated in FIG. 1 is a flatbed type inkjet textile printing apparatus.

The inkjet textile printing apparatus 10 according to the present embodiment processes a textile printing target P using the treatment liquid of the present embodiment described above. Since the treatment liquid according to the present embodiment is used, the inkjet textile printing apparatus 10 can yield a textile printed matter that is superior in color developability and is superior in fastness to wet rubbing, fastness to laundering, texture, and the like.

The inkjet textile printing apparatus 10 illustrated in FIG. 1 includes a processing head 1, a recording head 2, and a mounting table 3. The recording head 2 may include a first recording head 2a, a second recording head 2b, a third recording head 2c, and a fourth recording head 2d.

The processing head 1 ejects a treatment liquid to at least an image formation area of the textile printing target P. The treatment liquid to be used here is the treatment liquid described above. The processing head 1 is not particularly limited, and examples thereof include a piezoelectric head and a thermal inkjet head.

The recording head 2 ejects an ink to an image formation area of the textile printing target P. The first recording head 2a, the second recording head 2b, the third recording head 2c, and the fourth recording head 2d included in the recording head 2 eject differently colored inks (for example, yellow ink, magenta ink, cyan ink, and black ink), respectively. The number of recording heads is not limited to 4, and the number of recording heads may be 1 to 3 or 5 or more. The recording head 2 is not particularly limited, and examples thereof include a piezoelectric head and a thermal inkjet head.

On the mounting table 3 is mounted the textile printing target P. The processing head 1 and the recording head 2 are disposed above the mounting table 3 so that the ink and the treatment liquid can be ejected to the textile printing target P. By driving of a motor (not illustrated), the mounting table 3 horizontally moves in a direction from the processing head 1 toward the recording head 2 (for example, leftward in FIG. 1). Horizontal movement of the mounting table 3 conveys the textile printing target P on the mounting table 3.

The textile printing target P may be a woven fabric or a knitted fabric. Examples of the textile printing target P include cotton fabric, silk fabric, linen fabric, acetate fabric, rayon fabric, nylon fabric, polyurethane fabric, and polyester fabric.

In the present embodiment, in the preparation of a textile printed matter, first, the mounting table 3 on which the textile printing target P is mounted is moved horizontally, so that the textile printing target P is conveyed to a position facing the processing head 1. Then, the treatment liquid is ejected from the processing head 1 to the textile printing target P. The processing head 1 may eject the treatment liquid only to the image formation area of the textile printing target P, may eject the treatment liquid to an area wider than the image formation area of the textile printing target P, or may eject the treatment liquid to the entire surface of the textile printing target P. It is preferable that the processing head 1 ejects the treatment liquid only to the image formation area of the textile printing target P in order to reduce the amount of the treatment liquid used to inhibit a decrease in the touch of the textile printed matter. Since the processing head 1 can accurately control the position from which the treatment liquid is ejected, the treatment liquid can be ejected only to the area to which the ink has been ejected. In order to accurately control the position where the treatment liquid is ejected, the distance between the processing head 1 and the textile printing target P is preferably 1 mm or more and 5 mm or less.

After the treatment liquid is ejected from the processing head 1, the mounting table 3 on which the textile printing target P is mounted further horizontally moves, and the textile printing target P is conveyed to a position facing the recording head 2. Then, the ink is ejected from the recording head 2 to the image formation area of the textile printing target P. In this manner, an image is formed by the ink in the image formation area of the textile printing target P.

Although not shown, after the ink is ejected by the recording head 2, the mounting table 3 on which the textile printing target P is mounted may further move horizontally, and a posttreatment liquid may be ejected from another processing head. The posttreatment liquid is a non-coloring treatment liquid that does not develop color even when similarly attached to the textile printing target P, and is a treatment liquid that exhibits a function of enhancing fixability and fastness (resistance to rubbing and scraping) of the ink image printed on the textile printing target P by the recording head 2. As such a posttreatment liquid, a silicone-based treatment liquid or the like can be used. In such a manner, a processing film is formed from the posttreatment liquid on the image formed in the image formation area of the textile printing target P.

After the posttreatment liquid is ejected, the mounting table 3 on which the textile printing target P is mounted further moves horizontally, the textile printing target P is conveyed to a position facing a heating unit (not shown), and the heating unit heats the textile printing target P, so that the ink and the treatment liquid are dried. The heating temperature is, for example, 120° C. or higher and 180° C. or lower. The heating time is, for example, 1 minute or more and 10 minutes or less. By the heating, volatile components contained in the ink and the treatment liquid evaporate, and the fixing of the ink and the treatment liquid to the textile printing target P is promoted. As a result, an image is formed from the ink, and the textile printing target P processed with the treatment liquid is formed.

The treatment liquid of the present embodiment is not limited to use in the inkjet textile printing apparatus 10 described above, and may be modified, for example, as described in the following modified examples. For example, the inkjet textile printing apparatus 10 may include a spray for spraying the treatment liquid instead of the processing head 1 for ejecting the treatment liquid. Alternatively, the processing with the treatment liquid may be carried out by immersing the textile printing target P in a tank in which the treatment liquid is tanked. In the inkjet textile printing apparatus 10 described above, the mounting table 3 moves horizontally. Alternatively, the processing head 1 and the recording head 2 may move horizontally while the mounting table 3 is fixed. Alternatively, in the conveyance direction of the textile printing target P, the mounting table 3 may move horizontally or the processing head 1 and the recording head 2 may move horizontally, and in the direction perpendicular to the conveyance direction of the textile printing target P, the processing head 1 and the recording head 2 may move horizontally.

That is, as long as the inkjet textile printing apparatus includes the processing head 1 and the recording head 2, the effects derived from the use of the treatment liquid of the present embodiment can be acquired regardless of the mode of the inkjet textile printing apparatus.

[Ink]

The ink to be used for inkjet recording together with the treatment liquid of the present embodiment and the ink to be used in the textile printing apparatus are not particularly limited, and for example, an ink containing a pigment and an aqueous medium can be used. The ink may further contain at least one component selected from the group consisting of a surfactant, a polyol, and binder resin particles, as necessary.

As the pigment, for example, a dispersible pigment which is present in dispersion in an aqueous medium can be used. From the viewpoint of obtaining an ink superior in image density, hue, and color stability, D50 of the pigment is preferably 30 nm or more and 250 nm or less, and more preferably 70 nm or more and 160 nm or less.

Examples of the pigment include a yellow pigment, an orange pigment, a red pigment, a blue pigment, a purple pigment, and a black pigment. Examples of the yellow pigment include C.I. Pigment Yellow (74, 93, 95, 109, 110, 120, 128, 138, 139, 151, 154, 155, 173, 180, 185, and 193). Examples of the orange pigment include C.I. Pigment Orange (34, 36, 43, 61, 63, and 71). Examples of the red pigment include C.I. Pigment Red (122 and 202). Examples of the blue pigment include C.I. Pigment Blue (15, more specifically 15:3). Examples of the violet pigment include C.I. Pigment Violet (19, 23, and 33). Examples of the black pigment include C.I. Pigment Black (7).

The content of the pigment is preferably 1 wt % or more and 12 wt % or less, and more preferably 1 wt % or more and 7 wt % or less with respect to the weight of the entire ink. When the content of the pigment is 1 wt % or more, the image density of the recorded matter to be formed can be improved. When the content of the pigment is 12 wt % or less, an ink having high fluidity can be obtained.

In particular, the ink of the present embodiment preferably contains an anionic pigment. As a result, the cationic polymer and the anionic pigment contained in the above-described treatment liquid electrically cause reactive aggregation on a surface of a recording target, so that a binding resin (binder resin described later) contained in the ink can be inhibited from penetrating into a recording medium. This is particularly important when the recording medium is a fabric, and it is possible to prevent the binding resin from penetrating into the gaps among fibers and binding the fibers to each other. Thus, the texture (touch, etc.) of the fabric as a textile printing target can be improved.

As the anionic pigment, specifically, an anionic pigment having an anion group such as a carboxyl group, a sulfonic acid group, a phosphoric acid group, a phosphonic acid group, a phenylsulfonic acid group, or a phenylcarboxyl group is more preferable.

The aqueous medium contained in the ink of the present embodiment is a medium containing water as a main component. The aqueous medium may function as a solvent or as a dispersion medium. Specific examples of the aqueous medium include water or a mixed solution of water and a polar solvent. Examples of the polar solvent contained in the aqueous medium include methanol, ethanol, isopropyl alcohol, butanol, and methyl ethyl ketone. The content of water in the aqueous medium is preferably 90 wt % or more, and particularly preferably 100 wt %. The content of the aqueous medium is preferably 5 wt % or more and 70 wt % or less, and more preferably 40 wt % or more and 60 wt % or less, with respect to the weight of the entire ink.

Furthermore, when the ink contains a surfactant, the wettability of the ink to a recording target is improved. Examples of the surfactant include an anionic surfactant, a cationic surfactant, a nonionic surfactant, and an amphoteric surfactant. The surfactant contained in the ink is preferably a nonionic surfactant. The nonionic surfactant is preferably a surfactant having an acetylene glycol structure, and more preferably an acetylene diol ethylene oxide adduct. The HLB value of the surfactant is preferably 3 or more and 20 or less, more preferably 6 or more and 16 or less, and still more preferably 7 or more and 10 or less. The HLB value of a surfactant is calculated from the formula "HLB value=20× (sum of the formula weights of hydrophilic parts)/molecular weight" by, for example, the Griffin method. In order to improve the image density while inhibiting the image offset, the content of the surfactant is preferably 0.1 wt % or more and 5.0 wt % or less, and more preferably 0.5 wt % or more and 2.0 wt % or less with respect to the weight of the entire ink.

Furthermore, when the ink contains a polyol, the viscosity of the ink is suitably adjusted. The polyol to be contained in the ink is preferably a diol or a triol. Examples of the diol include glycol compounds, and more specifically include ethylene glycol, propylene glycol, diethylene glycol, triethylene glycol, and tetraethylene glycol. Examples of the triol include glycerin.

When the ink contains a polyol, in order to suitably adjust the viscosity of the ink, the content of the polyol is preferably 5 wt % or more and 60 wt % or less, and more preferably 20 wt % or more and 50 wt % or less with respect to the weight of the entire ink.

The binder resin particles contained in the ink of the present embodiment are present in a state of being dispersed in the aqueous medium. The binder resin particles function as a binder that bonds the textile printing target and the pigment. Thus, owing to the condition that the ink contains the binder resin particles, a textile printed matter having superior pigment fixability can be obtained.

Examples of the resin contained in the binder resin particles include urethane resins, (meth)acrylic resins, styrene-(meth)acrylic resins, styrene-maleic acid copolymers, vinyl naphthalene-(meth)acrylic acid copolymers, and vinyl naphthalene-maleic acid copolymers. The resin contained in the binder resin particles is preferably a urethane resin. The content of the urethane resin in the binder resin particles is preferably 80 wt % or more, and more preferably 100 wt %.

The content of the binder resin is preferably 1 wt % or more and 20 wt % or less, and more preferably 2 wt % or more and 10 wt % or less with respect to the weight of the entire ink. When the content of the binder resin particles is 1 wt % or more, a recording target having superior pigment fixability can be obtained. On the other hand, when the content of the binder resin particles is 20 wt % or less, the ink can be stably ejected to a recording target.

Furthermore, the ink of the present embodiment may further contain known additives (more specifically, dissolution stabilizers, anti-drying agents, antioxidants, viscosity regulators, pH regulators, fungicides, etc.), as necessary.

The ink to be used in the present embodiment is produced, for example, by mixing a pigment, an aqueous medium, and components to be added as necessary (for example, a surfactant, a polyol, and binder resin particles) using a stirrer. The mixing time is, for example, 1 minute or more and 30 minutes or less.

EXAMPLES

Hereinafter, the present disclosure will be explained more specifically with reference to Examples, but the present disclosure is not limited at all by the Examples.

Example 1

3 parts by weight (solid content) of "PAS-A5" (manufactured by Nittobo Medical Co., Ltd.) as a water-soluble cationic polymer, 10 parts by weight of ammonium acetate as an organic acid salt, 1 part by weight of a nonionic surfactant "SURFYNOL 440" (manufactured by Nissin Chemical Industry Co., Ltd.), 30 parts by weight of propylene glycol, and water as the balance were mixed (100 parts by weight in total), and then the mixture was filtered with a 5 μm filter, affording treatment liquid 1.

Example 2

Treatment liquid 2 was obtained in the same manner as in Example 1 except that the content of the water-soluble cationic polymer "PAS-A5" (manufactured by Nittobo Medical Co., Ltd.) was changed from 3 parts by weight to 9 parts by weight.

Example 3

Treatment liquid 3 was obtained in the same manner as in Example 1 except that the content of ammonium acetate was changed from 10 parts by weight to 15 parts by weight.

Example 4

Treatment liquid 4 was obtained in the same manner as in Example 1 except that the content of the water-soluble cationic polymer "PAS-A5" (manufactured by Nittobo Medical Co., Ltd.) was changed from 3 parts by weight to 0.5 parts by weight.

Example 5

3 parts by weight (solid content) of "PAS-A5" (manufactured by Nittobo Medical Co., Ltd.) as a water-soluble cationic polymer, 15 parts by weight of ammonium acetate as an organic acid salt, 3 parts by weight of calcium acetate monohydrate as a metal salt, 1 part by weight of a nonionic surfactant "SURFYNOL 440" (manufactured by Nissin Chemical Industry Co., Ltd.), 30 parts by weight of propylene glycol, and water as the balance were mixed (100 parts by weight in total), and then the mixture was filtered with a 5 μm filter, affording treatment liquid 5.

Example 6

Treatment liquid 6 was obtained in the same manner as in Example 5 except that the content of calcium acetate monohydrate was changed from 3 parts by weight to 5 parts by weight.

Example 7

Treatment liquid 7 was obtained in the same manner as in Example 5 except that the content of calcium acetate monohydrate was changed from 3 parts by weight to 6 parts by weight.

Example 8

Treatment liquid 8 was obtained in the same manner as in Example 1 except that the content of ammonium acetate was changed from 10 parts by weight to 16 parts by weight.

Example 9

Treatment liquid 9 was obtained in the same manner as in Example 5 except that the content of ammonium acetate was changed from 15 parts by weight to 5 parts by weight.

Example 10

Treatment liquid 10 was obtained in the same manner as in Example 2 except that the content of ammonium acetate was changed from 10 parts by weight to 9 parts by weight.

Example 11

Treatment liquid 11 was obtained in the same manner as in Example 1 except that ammonium acetate was changed to magnesium acetate tetrahydrate.

Example 12

Treatment liquid 12 was obtained in the same manner as in Example 2 except that ammonium acetate was changed to magnesium acetate tetrahydrate.

Example 13

Treatment liquid 13 was obtained in the same manner as in Example 3 except that ammonium acetate was changed to magnesium acetate tetrahydrate.

Example 14

Treatment liquid 14 was obtained in the same manner as in Example 4 except that ammonium acetate was changed to magnesium acetate tetrahydrate.

Comparative Example 1

10 parts by weight (solid content) of "PAS-A5" (manufactured by Nittobo Medical Co., Ltd.) as a water-soluble cationic polymer, 10 parts by weight of ammonium acetate as an organic acid salt, 1 part by weight of a nonionic surfactant "SURFYNOL 440" (manufactured by Nissin Chemical Industry Co., Ltd.), 30 parts by weight of propylene glycol, and water as the balance were mixed (100 parts by weight in total), and then the mixture was filtered with a 5 μm filter, affording treatment liquid 15.

Comparative Example 2

15 parts by weight (solid content) of "PAS-A5" (manufactured by Nittobo Medical Co., Ltd.) as a water-soluble cationic polymer, 3 parts by weight of ammonium acetate as an organic acid salt, 1 part by weight of a nonionic surfactant "SURFYNOL 440" (manufactured by Nissin Chemical Industry Co., Ltd.), 30 parts by weight of propylene glycol, and water as the balance were mixed (100 parts by weight in total), and then the mixture was filtered with a 5 μm filter, affording treatment liquid 16.

Comparative Example 3

Treatment liquid 17 was obtained in the same manner as in Comparative Example 1 except that the content of ammonium acetate was changed from 10 parts by weight to 3 parts by weight.

Comparative Example 4

3 parts by weight (solid content) of "PAS-A5" (manufactured by Nittobo Medical Co., Ltd.) as a water-soluble cationic polymer, 1 part by weight of a nonionic surfactant "SURFYNOL 440" (manufactured by Nissin Chemical Industry Co., Ltd.), 30 parts by weight of propylene glycol, and water as the balance were mixed (100 parts by weight in total), and then the mixture was filtered with a 5 μm filter, affording treatment liquid 18.

Comparative Example 5

Treatment liquid 19 was obtained in the same manner as in Comparative Example 4 except that the content of the water-soluble cationic polymer "PAS-A5" was changed from 3 parts by weight to 9 parts by weight.

Comparative Example 6

10 parts by weight of ammonium acetate as an organic acid salt, 1 part by weight of a nonionic surfactant "SURFYNOL 440" (manufactured by Nissin Chemical Industry Co., Ltd.), 30 parts by weight of propylene glycol, and water as the balance were mixed (100 parts by weight in total), and then the mixture was filtered with a 5 µm filter, affording treatment liquid 20.

The formulations of the treatment liquids of the above Examples and Comparative Examples are summarized in Table 1.

TABLE 1

| | Cationic polymer | Content [wt %] | Organic acid ammonium salt | Content [wt %] | Metal salt | Content [wt %] |
|---|---|---|---|---|---|---|
| Example 1 | PAS-A5 | 3 | Ammonium acetate | 10 | — | — |
| Example 2 | PAS-A5 | 9 | Ammonium acetate | 10 | — | — |
| Example 3 | PAS-A5 | 3 | Ammonium acetate | 15 | — | — |
| Example 4 | PAS-A5 | 0.5 | Ammonium acetate | 10 | — | — |
| Example 5 | PAS-A5 | 3 | Ammonium acetate | 10 | Calcium acetate | 3 |
| Example 6 | PAS-A5 | 3 | Ammonium acetate | 10 | Calcium acetate | 5 |
| Example 7 | PAS-A5 | 3 | Ammonium acetate | 10 | Calcium acetate | 6 |
| Example 8 | PAS-A5 | 3 | Ammonium acetate | 16 | — | — |
| Example 9 | PAS-A5 | 3 | Ammonium acetate | 5 | Calcium acetate | 5 |
| Example 10 | PAS-A5 | 9 | Ammonium acetate | 9 | — | — |
| Comparative Example 1 | PAS-A5 | 10 | Ammonium acetate | 10 | — | — |
| Comparative Example 2 | PAS-A5 | 15 | Ammonium acetate | 3 | — | — |
| Comparative Example 3 | PAS-A5 | 10 | Ammonium acetate | 3 | — | — |
| Comparative Example 4 | PAS-A5 | 3 | Ammonium acetate | — | — | — |
| Comparative Example 5 | PAS-A5 | 9 | — | — | — | — |
| Comparative Example 6 | — | — | Ammonium acetate | 10 | — | — |

(Preparation of Ink)

An ink was prepared using an anionic pigment dispersion "AE-2078F" having a pigment concentration of 20% (manufactured by Sanyo Color Works, Ltd.), a urethane dispersion "SUPERFLEX 470" having a solid content of 38% (manufactured by DKS Co., Ltd.), a nonionic surfactant "SURFYNOL 440" (manufactured by Nissin Chemical Industry Co., Ltd.), propylene glycol, and water.

A specific ink formulation was pigment: 4 wt %, urethane: 8 wt %, propylene glycol: 30 wt %, surfactant: 1 wt %, and balance: water. After mixing the components at the above ratio, the mixture was filtered with a 5 µm filter, affording an ink.

(Preparation of Posttreatment Liquid)

A posttreatment liquid was prepared using an emulsion "POLON-MF-51" (manufactured by Shin-Etsu Chemical Co., Ltd.) of silicone oil having a silicone oil content of 39%, propylene glycol, and water. The specific formulation was silicone oil: 10 wt %, propylene glycol: 30 wt %, and balance: water. After mixing the components at the above ratio, the mixture was filtered with a 5 µm filter, affording a posttreatment liquid.

<Printing>

For inkjet printing, a flatbed printing jig in which KJ4B heads manufactured by KYOCERA Corporation were arranged in a conveyance direction was used. The pretreatment liquid was charged into the first head, the ink was charged into the second head, and the posttreatment liquid was charged into the third head, and inkjet printing was performed under the following conditions.

Fabric used: Polyester Tropical
Fabric/head distance: 3 mm, head temperature: 25° ° C.
Drying: 150° ° C. for 3 minutes (oven)

<Evaluation Test>

(Image Density)

Color measurement was performed using a fluorescent spectrodensitometer FD-5 (manufactured by KONICA MINOLTA, INC.). The evaluation criteria were as follows.

Image density (OD) is 1.3 or more "Good" Color developability is good.
Image density (OD) is less than 1.3 "Poor" Color developability is poor.

(Fastness to Rubbing)

In accordance with the wet test of the friction tester type II (Gakushin type) method described in JIS L-0849: 2013 (Test methods for color fastness to rubbing), a solid image formed on a textile printed matter for evaluation was rubbed using a white cotton fabric for rubbing. The degree of coloring of a white cotton fabric for rubbing after rubbing was evaluated according to the "Assessment criteria for discoloration" described in Item 10 (Assessment of color fastness) of JIS L-0801: 2011 (General principles of testing methods for color fastness). The degree of coloring of a white cotton fabric for rubbing was assessed in nine stages (grade 1, 1-2, 2, 2-3, 3, 3-4, 4, 4-5, and 5 in descending order of the degree of staining). The lower the degree of coloring of the white cotton fabric for rubbing (closer to grade 5), the better the fastness to rubbing. From the degree of coloring of a white cotton fabric for rubbing after a rubbing test, the fastness to wet rubbing was evaluated according to the following criteria.

Fastness to wet rubbing is grade 3 or higher "Good" Fastness to wet rubbing is good
Fastness to wet rubbing is less than grade 3 "Poor" Fastness to wet rubbing is poor (Texture)

An unused textile printing target was folded in half along the warp (in the length direction), and the distance (loop height) between the lower and upper parts of the fabric at the crease was measured. The measured loop height of the unused textile printing target was defined as the loop height before textile printing. Next, the area where the solid image of the textile printed matter for evaluation was formed was folded in half along the warp (in the length direction), and the loop height was measured. The measured loop height of the textile printed matter for evaluation was defined as the loop height after textile printing. The change rate of loop height (unit: %) before and after the textile printing was calculated according to the formula "Loop height change rate=100×loop height after textile printing/loop height before textile printing". The lower the change rate of the loop height is, the more, even after textile printing, the textile printing target avoids becoming hard and avoids swelling, indicating that the deterioration of the touch of the textile printed matter is more inhibited. The evaluation criteria were as follows.

Less than 130% "Good" Change in texture is small and the texture is good
130% or more "Poor" Texture changed hard and the texture is poor (Fastness to Laundering)

The textile printed matter for evaluation to which the printing described above had been applied was processed using a launder-ometer (washing tester) in accordance with Method A-2 described in JIS L-0844: 2011 (Test methods for color fastness to washing and laundering). Thereafter, the textile printed matter for evaluation was rinsed, dehydrated, and dried, and the degree of discoloration thereof was assessed according to the "Assessment criteria for discoloration".

The evaluation criteria were as follows.
Fastness to laundering (discoloration) is grade 3-4 or higher "Good" Fastness to laundering is good
Fastness to laundering (discoloration) is lower than grade 3-4 "Poor" Fastness to laundering is poor The results of the evaluation tests described above are summarized in Table 2.

TABLE 2

| | Image density | Fastness to wet rubbing | Texture | Fastness to laundering Discoloration |
|---|---|---|---|---|
| Example 1 | 1.34 good | Grade 3-4 good | 109 good | Grade 3-4 good |
| Example 2 | 1.38 good | Grade 3-4 good | 110 good | Grade 3-4 good |
| Example 3 | 1.37 good | Grade 3-4 good | 110 good | Grade 3-4 good |
| Example 4 | 1.33 good | Grade 3-4 good | 107 good | Grade 3-4 good |
| Example 5 | 1.35 good | Grade 3-4 good | 120 good | Grade 4 excellent |
| Example 6 | 1.35 good | Grade 3-4 good | 128 good | Grade 4 excellent |
| Example 7 | 1.35 good | Grade 3-4 good | 129 good | Grade 4 excellent |
| Example 8 | 1.37 good | Grade 3 good | 110 good | Grade 3-4 good |
| Example 9 | 1.32 good | Grade 3-4 good | 128 good | Grade 4 excellent |
| Example 10 | 1.36 good | Grade 3-4 good | 111 good | Grade 3-4 good |
| Comparative Example 1 | 1.39 good | Grade 2 poor | 110 good | Grade 3-4 good |
| Comparative Example 2 | 1.39 good | Grade 1-2 poor | 112 good | Grade 3-4 good |
| Comparative Example 3 | 1.33 good | Grade 2 poor | 112 good | Grade 3-4 good |
| Comparative Example 4 | 1.19 poor | Grade 3-4 good | 108 good | Grade 3-4 good |
| Comparative Example 5 | 1.29 poor | Grade 3 good | 115 good | Grade 3-4 good |
| Comparative Example 6 | 1.29 poor | Grade 3 good | 109 good | Grade 3 poor |

(Discussion)

From the results in Table 2, it was confirmed that the use of the treatment liquid of the present disclosure provides a textile printed matter having good color developability (image density) and being superior in fastness to wet rubbing, texture, and fastness to laundering. In particular, it was also found that when the treatment liquids of Examples 5 to 7 and 9 further containing a metal salt are used, textile printed matters having excellent fastness to laundering are obtained. From the results of Examples 3 and 8, it was also found that the fastness to wet rubbing is further superior when the content of the organic acid salt is 15 wt % or less. From the results of Examples 2 and 10, it was also found that the image density is improved when the content of the organic acid salt is larger than the content of the cationic polymer. From the results of Examples 6 and 9, it was also found that the image density is improved when the content of the organic acid salt is larger than the content of the metal salt.

From the results of Examples 11 to 14, it was also confirmed that in the case of using magnesium acetate as the organic acid salt, the fastness to laundering is excellent even if the metal salt is not contained as long as the content of magnesium acetate with respect to the entire amount of inkjet treatment liquid is somewhat large (about 12 to 15 wt %).

On the other hand, it was shown that when the treatment liquids of Comparative Examples 1 to 3 in which the content of the water-soluble cationic polymer is 10 wt % or more are used, sufficient fastness to wet rubbing is not obtained. In Comparative Examples 4 to 5 using the treatment liquids containing no organic acid salt and Comparative Example 6 using the treatment liquid containing no water-soluble cationic polymer, the image density was poor. In addition, in Comparative Example 6, fastness to laundering was also insufficient.

The invention claimed is:

1. An inkjet treatment liquid, comprising a water-soluble cationic polymer, an organic acid salt, and a metal salt,
   wherein a content of the water-soluble cationic polymer is 0.1 wt % or more and less than 10 wt % with respect to the entire amount of the inkjet treatment liquid, and
   wherein a content of the organic acid salt is larger than a content of the metal salt.

2. The inkjet treatment liquid according to claim 1, wherein a content of the organic acid salt is 0.1 to 20 wt % with respect to the entire amount of the inkjet treatment liquid.

3. The inkjet treatment liquid according to claim 1, wherein a content of the organic acid salt is larger than a content of the water-soluble cationic polymer.

4. The inkjet treatment liquid according to claim 3, wherein a content of the organic acid salt is 1 to 15 wt % with respect to the entire amount of the inkjet treatment liquid.

5. The inkjet treatment liquid according to claim 1, wherein a content of the metal salt is 0.1 to 5 wt % with respect to the entire amount of the inkjet treatment liquid, and a content of the organic acid salt is 1 to 15 wt % with respect to the entire amount of the inkjet treatment liquid.

6. An inkjet treatment liquid, comprising a water-soluble cationic polymer and an organic acid salt,
   wherein a content of the water-soluble cationic polymer is 0.1 wt % or more and less than 10 wt % with respect to the entire amount of the inkjet treatment liquid
   wherein the organic acid salt is an organic acid magnesium salt, and
   wherein a content of the organic acid magnesium salt is 12 to 15 wt % with respect to the entire amount of the inkjet treatment liquid.

7. The inkjet treatment liquid according to claim 1, wherein the treatment liquid is for textile printing.

8. An inkjet textile printing apparatus, comprising:
   at least a processing head configured to eject a treatment liquid to at least an image formation area of a textile printing target;
   a recording head configured to eject an ink to the image formation area of the textile printing target; and
   a mounting table configured to convey the textile printing target,
   wherein the treatment liquid to be ejected from the processing head is the inkjet treatment liquid according to claim 1.

9. The inkjet treatment liquid according to claim 6, further comprising a metal salt.

10. The inkjet treatment liquid according to claim 9, wherein a content of the organic acid salt is larger than a content of the metal salt.

11. The inkjet treatment liquid according to claim 6, wherein the treatment liquid is for textile printing.

12. An inkjet textile printing apparatus, comprising:
   at least a processing head configured to eject a treatment liquid to at least an image formation area of a textile printing target;
   a recording head configured to eject an ink to the image formation area of the textile printing target; and
   a mounting table configured to convey the textile printing target,
   wherein the treatment liquid to be ejected from the processing head is the inkjet treatment liquid according to claim 6.

* * * * *